CRYOTRON CONTROLLED STORAGE CELL

Filed Feb. 14, 1966 2 Sheets-Sheet 1

Inventors:
Vernon L. Newhouse,
Harold M. Edwards,
by Marvin Snyder
Their Attorney.

Inventors:
Vernon L. Newhouse,
Harold H. Edwards,
by Marvin Snyder
Their Attorney.

3,346,829

CRYOTRON CONTROLLED STORAGE CELL

Vernon L. Newhouse, 8 Rosemary Drive, Scotia, N.Y. 12302, and Harold H. Edwards, 1151 Dean St., Schenectady, N.Y. 12309

Filed Feb. 14, 1966, Ser. No. 527,256
14 Claims. (Cl. 338—32)

ABSTRACT OF THE DISCLOSURE

A planar storage cell of soft superconductor material in the form of a loop including two parallel legs, only one of which is controllably switched into its normal state by the magnetic field created by current crossing over these legs in a path of hard superconductor material directed perpendicularly thereto. By narrowing the width of hard superconductor material at the active crossover, a magnetic field of greater intensity than at the inactive crossover is there established.

This invention relates to persistent current storage cells, and more particularly to a crossed film cryotron controlled memory cell having no dissimilar metal-to-metal contacts.

Various crossed film cryotron (hereinafter designated CFC) controlled memory cells for word-organized memories have been proposed, such as shown and described on page 223 of Applied Superconductivity by V. L. Newhouse, John Wiley and Sons, 1964. These cells utilize a storage loop including two parallel legs, one of which is made resistive by the magnetic field of write control current during occurrence of a write pulse, while the second leg remains superconducting. To achieve this condition, a soft superconductor material is required for the first leg of the loop, which at times is rendered resistive, and a hard superconductor material is required for the second leg. The terms "hard" and "soft" superconductors, as used in the art, relate to the strength of an applied magnetic field required to change the superconductor from its superconducting to its normal or non-superconducting state; that is when maintained at cryogenic temperatures, a soft superconductor changes to its normal state under the influence of a relatively weak magnetic field, while a hard superconductor may remain superconducting even under the influence of an extremely strong magnetic field. Typically, tin is used as the soft superconductor material and lead as the hard superconductor material; alternatively, however, indium and niobium may be used as the soft and hard superconductor materials, respectively.

The soft superconductor leg of the storage loop comprises a gate conductor, which is crossed by a control conductor at substantially right angles thereto. The control conductor, which comprises a hard superconductor material, is electrically insulated from the gate but magnetically coupled thereto at the crossover. Thus, the magnetic field resulting from sufficient current flow in the control conductor causes the soft superconductor leg of the storage loop to become resistive in the vicinity of the crossover. A crossover of this type is commonly known as an "active" crossover.

The superconductive condition of the remainder of the cell remains undisturbed by flow of control conductor current. Thus, where the control conductor crosses the second leg of the storage loop, which is comprised of hard superconductor material, the magnetic field created by flow of control conductor current is of insufficient intensity to ever drive the second leg into its normal or resistive condition. A crossover of this type is commonly known as an "inactive" crossover.

Although, in principle, the contact area between the tin and lead regions of conventional storage loops need not be much wider than the thickness of either the tin or the lead region, it is necessary, in practice, that the contact area be considerably wider than the width of the lead control. One reason for this requirement is to compensate for the decrease in area available for contact, caused by oxide formation on the contacting surface of the tin. Another reason for this requirement arises because the insulating material deposited on the gate conductor prior to deposition of the lead, in order to insulate the gate from the control conductor, overlaps onto the contacting surface of the tin and diminishes the area available for intermetallic contact; hence, compensation for this decrease in area is also necessary. Therefore, it is evident that miniaturization of the size of conventional CFC storage cells is limited by the necessity of maintaining a relatively large superconducting contact area between the lead and tin films which together comprise the storage loop.

The present invention avoids all need for maintaining contact between two dissimilar superconductor materials, since both of the aforementioned parallel legs of the storage loop are fabricated of a single soft superconductor material, such as tin. Moreover, by widening the control conductor in the vicinity of its crossing over the second leg of the storage loop, the second leg is made inactive; that is, the second leg remains superconducting even during flow of maximum current through the control conductor.

Accordingly, one object of the invention is to provide a cryotron controlled storage cell having no dissimilar metal-to-metal contact.

Another object is to provide a CFC controlled memory cell structure which facilitates high stacking density in apparatus requiring a plurality of such cells.

Another object is to provide an improved cryotron controlled storage cell having two insulated crossovers, one of which is inactive.

Another object is to provide a CFC controlled memory cell of simple construction, characterized by ease of fabrication.

Generally, in a preferred embodiment of the invention, there is provided a cryotron controlled storage cell comprising a closed path of soft superconductor material having at least two parallel legs, a path of hard superconductor material crossing over both of the legs and preferably directed substantially normal thereto, and insulating means spacing the path of hard superconductor material from the path of soft superconductor material at each of the crossovers. The path of hard superconductor material is wider at a first crossover than at the second, so as to facilitate establishment of a weaker magnetic field at the first crossover than at the second crossover.

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

Figure 1:
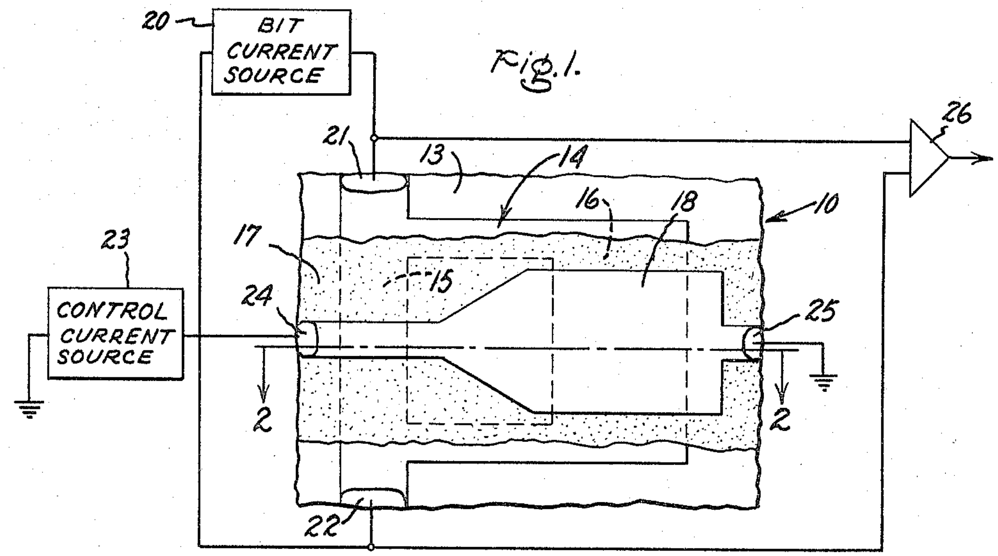
FIGURE 1 is a top view illustration of one cell of the present invention, showing bias means of operating the cell.

FIGURE 1 is a schematic illustration of a CFC memory cell 10 constructed in accordance with the instant invention and connected in a circuit for performing a storage function. A soft superconductor, such as tin, is deposited in the form of a closed path or loop 14 having first and second parallel legs 15 and 16 respectively, on a film of insulation 13, such as silicon oxide, niobium oxide or photoresist. Leg 15 comprises the gate conductor of the CFC. The width of leg 16 is preferably greater than that of leg 15, so as to maintain a relatively low current density in leg 16 and assure that leg 16 is continually superconducting. However, leg 15 is itself fabricated with sufficient width to maintain gate conductor inductance at a relatively low value.

A second layer of insulation 17 is deposited over at least sufficient area of loop 14 to insulate the loop from a control conductor 18 comprised of a path of hard superconductor material, such as lead, which is deposited so as to cross over legs 15 and 16 of loop 14. Control conductor 18 is shaped so that the region crossing over leg 15 is narrower than the region crossing over leg 16; hence, magnetic flux density due to control conductor current is considerably greater in the vicinity where control conductor 18 crosses over leg 15 than where the control conductor crosses over leg 16.

A binary digit or bit current source 20 is connected to leg 15 of loop 14 by, for example, soldered connections 21 and 22 at either end thereof. Similarly, a control conductor current source 23 is connected to control conductor 18 by, for example, soldered connections 24 and 25 at either end thereof. A sensitive readout amplifier 26 which, for illustrative purposes, is assumed to have a high input impedance so as to be voltage sensitive, is connected across leg 15 of loop 14.

Figure 2:
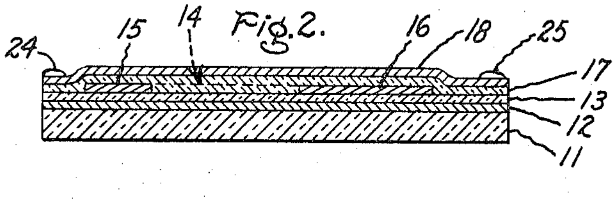
FIGURE 2 is a sectional view of the single cell of FIGURE 1, taken along line 2—2.

FIGURE 2 is a sectional view of the cell of FIGURE 1 along line 2—2, showing the vertical relationships of the various cell layers to each other. Thus, a superconductive shield or ground plane 12 may be deposited on an insulating substrate 11, such as glass. This ground plane is fabricated of a thin film of hard superconductor material, such as lead or niobium, and serves to reduce inductance of the memory cell circuitry so as to greatly increase cell operating speed. The base layer of insulation 13 is deposited on ground plane 12, and loop 14 is thereafter deposited on insulation 13. Insulation 17 is shown separating loop 14 from control conductor 18. If desired, the entire cell may be coated with a layer of insulation (not shown).

Figure 3:
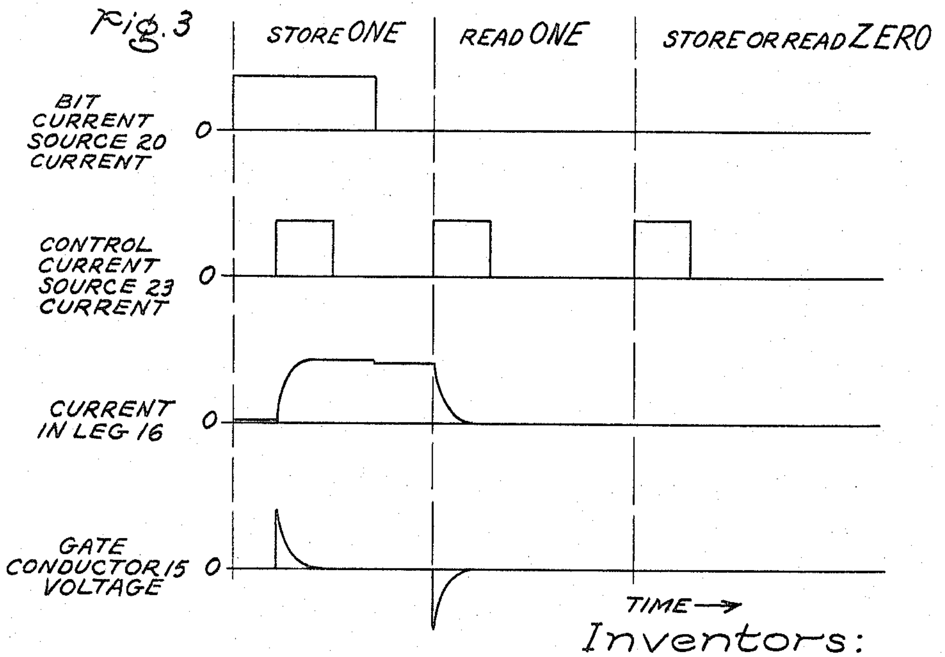
FIGURE 3 represents waveforms to aid in explaining operation of the cell shown in FIGURES 1 and 2.

Operation of the cell shown in FIGURES 1 and 2 may be readily understood with the aid of waveforms shown in FIGURE 3. Thus, to write or store a binary ONE in the cell, bit current source 20 first provides output current which, until control current source 23 provides output current, flows almost entirely from terminal 21 through the gate conductor, or leg 15, of loop 14 to terminal 22. During this interval, current in leg 16 of loop 14 is extremely low, since the current path including leg 16 is more inductive than that including leg 15, and leg 16 is shunted by the non-resistive gate conductor 15. However, when a write current is supplied from control current source 23, a high intensity magnetic field is created at the narrow portion of control conductor 18, while a much lower magnetic field is created in the vicinity of the wide portion thereof. Only the field strength in the vicinity of the narrow portion of the control conductor is sufficiently high to exceed the critical value for the soft superconductor material of loop 14; hence, gate 15 switches to its normal or resistive conduction, while leg 16 remains superconducting. Because gate conductor 15 is thus shunted by a non-resistive circuit including leg 16, current from bit current source 20 is diverted into leg 16. At the outset of this diversion, current flowing through the non-resistive gate conductor 15 produces a positive voltage pulse which makes terminal 21 positive with respect to terminal 22. This voltage pulse decays to zero as current flow through the gate conductor falls to zero. By requiring that amplifier 26 be polarity responsive, this voltage pulse is ignored by the system.

When control current ceases while bit current source 20 is still producing current, gate conductor 15 reverts to its superconducting condition due to collapse of the control conductor magnetic field. However, because leg 16 of loop 14 is superconducting, no voltage drop appears across leg 16 to divert current from leg 16 to leg 15. Thus, current from bit current source 20 continues to flow through leg 16.

When bit current source 20 is thereafter switched off, energy stored due to inductance of leg 16 produces a reverse current flow through the non-resistive gate conductor 15, thereby establishing a persistent circulating current through loop 14. Since it is assumed that current, when produced by bit current source 20, is directed to terminal 21, the persistent current circulating through loop 14 assumes a clockwise direction. This persistent circulating current represent a stored binary ONE.

To read out the stored binary ONE, it is necessary only to supply current from control current source 23 to control conductor 18, as indicated in FIGURE 3, so as to switch gate conductor 15 back to its normal or resistive condition in the vicinity of the crossover with control conductor 18. When gate conductor 15 becomes resistive, the circulating current produces a voltage drop across the gate conductor, making terminal 22 positive with respect to terminal 21. This negative voltage drop is applied to the input of polarity responsive amplifier 26, which responds by providing an output indication signifying readout of a binary ONE. However, since the resistive condition of gate conductor 15 causes the current circulating in loop 14, and hence the output voltage of gate conductor 15, to fall to zero, the readout circuit is of the class known as "destructive" readouts.

To store a binary ZERO in loop 14, the waveforms of FIGURE 3 indicate that current is supplied to control conductor 18 from control current source 23, while no current is supplied to loop 14 from bit current source 20. No persistent circulating current of any type is thereby established in loop 14. Existence of this condition is herein defined as storage of a binary ZERO.

Readout of a stored ZERO is provided when current from control current source 23 is supplied to control conductor 18. This causes gate conductor 15 to switch to its normal condition. However, since no persistent circulating current flows through loop 14 at this time, no output voltage is produced across gate conductor 15. This condition is interpreted by amplifier 26 as readout of a stored binary ZERO.

It is alternatively possible to use a bi-directional current supply for bit current source 20, so as to achieve storage of a binary ONE, for example, with current passing through gate conductor 15 from terminal 21 to terminal 22, and a binary ZERO with reverse flow of bit current through the gate conductor. In such case, storage of a ONE is manifested by clockwise persistent current circulating through loop 14, and a ZERO by counterclockwise persistent current circulating therein. Readout is achieved by passing current through control conductor 18 from control current source 23, so as to render gate conductor 15 resistive. The polarity of voltage thereby produced indicates whether a ZERO or a ONE has been read out. However, provision must be made to avoid false readout indications during those intervals in which current is produced by bit current source 20. One such possible provision might involve insertion of a gate in the output circuitry of amplifier 26 to disconnect the output of the amplifier from utilization apparatus in response to output current from bit current source 20.

It is now apparent that leg 16 remains continually superconducting, while leg 15 is switched between its normal and non-resistive conditions. Therefore, the crossover of control conductor 18 with leg 15 is an active crossover, while the crossover of control conductor 18 with leg 16 is an inactive crossover. Leg 16 remains superconducting, not only because it is situated within a low flux density magnetic field in the presence of control conductor current, but also because current circulating through loop 14 is of low density within the relatively wide superconducting leg 16.

Although a current imbalance during the storing or writing process is generally sufficient to create a circulating through loop 14 when gate current source 20 is switched off, thermal effects make it difficult to predict the magnitude of the circulating current produced thereby. Hence it is important that leg 16 remain superconducting during the storing or writing process. Furthermore, driving both legs 15 and 16 resistive would, in general, decrease cell operating speed. Therefore, the shape of control conductor 18 as shown in FIGURE 1 is preferable to use of a control conductor of uniform width.

Figure 4:
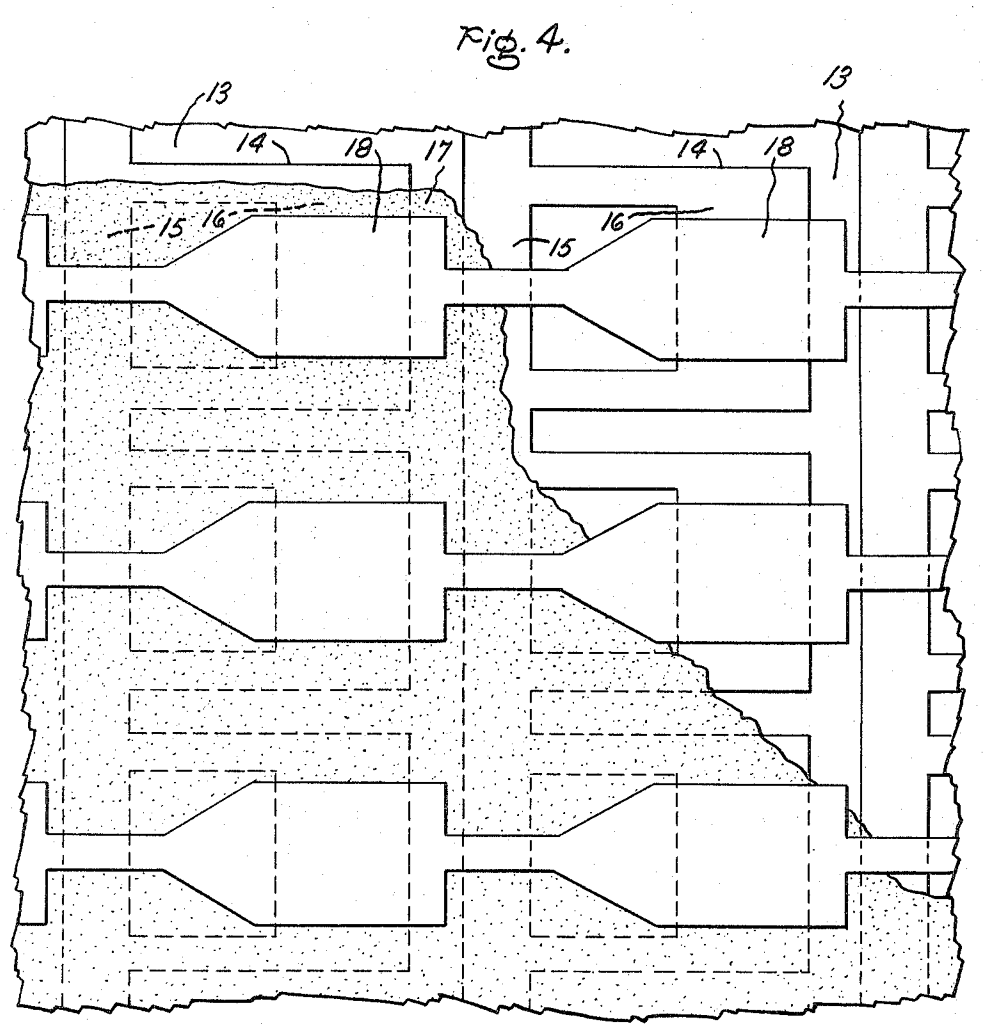
FIGURE 4 is a top view illustration of a plurality of cells such as shown in FIGURES 1 and 2, arranged in a planar array.

FIGURE 4 illustrates a portion of a planar array comprising a plurality of cells such as shown in FIGURES 1 and 2, with like numerals indicating like structural components. Such array can be fabricated in the manner described for a single cell, with large numbers of each component being produced simultaneously. Thus, the entire ground plane of hard superconductor material would be deposited on a substrate followed by layer of insulation 13, followed by circulating loops 14 of soft superconductor material which are integrally joined in columnar fashion through legs 15, followed by insulation 17 which is shown partially broken away for clarity of illustration, and finally followed by control conductors 18 which are integrally formed in continuous strips and arranged in rows. The entire array may then be covered with a layer of insulation, if desired. An array of this type permits high stacking density, due to its low thickness, so that a large number of cells may be fitted into a small volume of space.

The foregoing describes a crossed film cryotron controlled memory cell having no dissimilar metal-to-metal contacts. The cell has two insulated crossovers, one of which is inactive, and, by virtue of its minimal size, facilitates high packing density in apparatus requiring a plurality of such cells. The cell is characterized by simple construction and ease of fabrication.

While only certain preferred features of the invention have been shown by way of illustration, many modifications and changes will occur to those skilled in the art. It is, therefore, to be understood that the appended claims are intended to cover all such modifications and changes which fall within the true spirit and scope of the invention.

What we claim as new and desire to secure by Letters Patent of the United States is:

1. A cryotron controlled storage cell comprising a closed path of soft superconductor material having at least two parallel legs, a path of hard superconductor material crossing over both of said legs and directed substantially normal thereto, and insulating means spacing the path of hard superconductor material from the path of soft superconductor material at each of the crossovers, said path of hard superconductor material being wider at one of said crossovers than at the other of said crossovers so as to facilitate establishment of a weaker magnetic field at said one crossover than at said other crossover due to current flow in said hard superconductor material.

2. The cryotron controlled storage cell of claim 1 wherein said soft superconductor material comprises tin, and said hard superconductor material comprises lead.

3. The cryotron controlled storage cell of claim 1 wherein the center of said path of hard superconductor material crosses over both said parallel legs of soft superconductor material at locations situated to divide the length of each of said two parallel legs into two segments.

4. The cryotron controlled storage cell of claim 1 wherein the parallel leg of soft superconductor material at said one crossover is wider than the parallel leg of soft superconductor material at said other crossover.

5. The cryotron controlled storage cell of claim 4 wherein said soft superconductor material comprises tin, and said hard superconductor material comprises lead.

6. The cryotron controlled storage cell of claim 4 wherein the center of said path of hard superconductor material crosses over both said parallel legs of soft superconductor material at locations situated to divide the length of each of said two parallel legs into two segments.

7. The cryotron controlled storage cell of claim 1 including a uniform film of said hard superconductor material underlying said closed path of soft superconductor material, and additional insulating means spacing said uniform film of hard superconductor material from said closed path of soft superconductor material.

8. The cryotron controlled storage cell of claim 7 wherein said soft superconductor material comprises tin, and said hard superconductor material comprises lead.

9. The cryotron controlled storage cell of claim 1 including a uniform film of an additional hard superconductor material underlying said closed path of soft superconductor material, and additional insulating means spacing said uniform film of additional hard superconductor material from said closed path of soft superconductor material.

10. A planar array of rows and columns of cryotron memory devices, each said device comprising the cell of claim 1, wherein one of said two parallel legs in each cell of each respective column is formed integrally with said one leg of each adjacent cell in said respective column, and said hard superconductor material in each cell of each respective row is formed integrally with said hard superconductor material of each adjacent cell in said respective row.

11. The planar array of claim 10 including a uniform sheet of said hard superconductor material underlying said rows and columns, and insulating means spacing said uniform sheet of hard superconductor material from each of the cells in said array.

12. The planar array of claim 11 wherein said soft superconductor material comprises tin, and said hard superconductor material comprises lead.

13. The planar array of claim 10 including a uniform sheet of an additional hard superconductor material underlying said rows and columns, and additional insulating means spacing said uniform sheet of additional hard superconductor material from each of the cells in said array.

14. The planar array of claim 13 wherein said closed path of soft superconductor material comprises tin, and said path of hard superconductor material comprises lead.

References Cited

UNITED STATES PATENTS

| | | | |
|---|---|---|---|
| 2,962,681 | 11/1960 | Lentz | 338—32 |
| 2,966,647 | 12/1960 | Lentz | 338—32 |
| 2,983,889 | 5/1961 | Green | 338—32 |
| 2,989,714 | 6/1961 | Park et al. | 338—32 |
| 2,989,716 | 6/1961 | Brennemann et al. | 338—32 |
| 3,059,196 | 10/1962 | Lentz | 338—32 |
| 3,082,408 | 3/1963 | Garwin | 340—173.1 |
| 3,106,648 | 10/1963 | McMahon et al. | 307—88.5 |
| 3,149,240 | 9/1964 | Beesley | 338—32 |
| 3,283,282 | 11/1966 | Rosenberg et al. | 338—32 |

RICHARD M. WOOD, *Primary Examiner.*

W. D. BROOKS, *Assistant Examiner.*

UNITED STATES PATENT OFFICE

CERTIFICATE OF CORRECTION

Patent No. 3,346,829 October 10, 1967

Vernon L. Newhouse et al.

It is hereby certified that error appears in the above numbered patent requiring correction and that the said Letters Patent should read as corrected below.

In the heading to the printed specification, lines 3 to 5, for "Vernon L. Newhouse, 8 Rosemary Drive, Scotia, N. Y. 12302, and Harold H. Edwards, 1151 Dean St., Schenectady, N. Y. 12309" read -- Vernon L. Newhouse, Scotia, N. Y., and Harold H. Edwards, Schenectady, N. Y., assignors to General Electric Company, a corporation of New York --.

Signed and sealed this 22nd day of October 1968.

(SEAL)
Attest:

Edward M. Fletcher, Jr.
Attesting Officer

EDWARD J. BRENNER
Commissioner of Patents